(12) United States Patent
Ramaswamy

(10) Patent No.: US 10,366,715 B1
(45) Date of Patent: Jul. 30, 2019

(54) SLIDER WITH HEAT SINK BETWEEN READ TRANSDUCER AND SUBSTRATE

(71) Applicant: Seagate Technology LLC, Cupertino, CA (US)

(72) Inventor: Vasudevan Ramaswamy, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/873,119

(22) Filed: Jan. 17, 2018

Related U.S. Application Data

(60) Provisional application No. 62/461,952, filed on Feb. 22, 2017.

(51) Int. Cl.
| | |
|---|---|
| *G11B 5/60* | (2006.01) |
| *G11B 5/33* | (2006.01) |
| *G11B 5/48* | (2006.01) |
| *G11B 5/31* | (2006.01) |
| *G11B 5/105* | (2006.01) |
| *G11B 11/105* | (2006.01) |
| *G11B 5/40* | (2006.01) |
| *G11B 5/00* | (2006.01) |

(52) U.S. Cl.
CPC ............ *G11B 5/4826* (2013.01); *G11B 5/105* (2013.01); *G11B 5/314* (2013.01); *G11B 5/3133* (2013.01); *G11B 5/3136* (2013.01); *G11B 5/40* (2013.01); *G11B 5/607* (2013.01); *G11B 5/6088* (2013.01); *G11B 11/10536* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,381,094 B1 | 4/2002 | Gill | |
| 7,170,713 B2 * | 1/2007 | Gider | G11B 5/105 360/128 |
| 7,209,329 B2 | 4/2007 | Gill et al. | |
| 7,623,322 B2 * | 11/2009 | Umehara | G11B 5/6064 360/125.74 |
| 7,898,767 B2 * | 3/2011 | Yamanaka | G11B 5/1278 360/125.31 |
| 8,760,787 B2 * | 6/2014 | Wagatsuma | G11B 5/607 360/125.31 |
| 8,817,425 B1 | 8/2014 | Wu et al. | |
| 9,142,230 B2 * | 9/2015 | Ramaswamy | G11B 5/314 |
| 9,842,614 B2 * | 12/2017 | Hutchinson | G11B 5/3133 |
| 10,032,468 B1 * | 7/2018 | Wessel | G11B 5/3133 |
| 2005/0094319 A1 * | 5/2005 | Han | G11B 5/3133 360/319 |

(Continued)

*Primary Examiner* — Jefferson A Evans
(74) *Attorney, Agent, or Firm* — Hollingsworth Davis, LLC

(57) ABSTRACT

A slider has a read transducer comprising first and second shields surrounding a read sensor. The first shield faces a substrate. A first end of the reader stack is at a media-facing surface of the slider and a second end of the reader stack faces away from the first end. A heater is located farther away from the media-facing surface than the second end of the read transducer. The heater is configured to control a thermal protrusion of the read transducer from the media-facing surface. A heat sink is located between the first shield and the substrate.

20 Claims, 5 Drawing Sheets

(56) References Cited

U.S. PATENT DOCUMENTS

| | | | | |
|---|---|---|---|---|
| 2006/0034013 A1* | 2/2006 | Kato | ................. | G11B 5/3106 |
| | | | | 360/128 |
| 2006/0077591 A1* | 4/2006 | Kurihara | ............. | G11B 5/3106 |
| | | | | 360/128 |
| 2006/0291098 A1* | 12/2006 | Ota | ................. | G11B 5/3133 |
| | | | | 360/128 |
| 2007/0247758 A1* | 10/2007 | Kurita | ............... | G11B 5/6005 |
| | | | | 360/234.7 |
| 2008/0100965 A1* | 5/2008 | Oki | ................. | G11B 5/3133 |
| | | | | 360/234.3 |
| 2010/0073815 A1* | 3/2010 | Aoki | ................ | G11B 5/3106 |
| | | | | 360/110 |
| 2010/0118442 A1* | 5/2010 | Kuroki | ............. | G11B 5/3136 |
| | | | | 360/234.3 |
| 2010/0309581 A1* | 12/2010 | Wu | ................. | G11B 5/1278 |
| | | | | 360/123.12 |
| 2011/0149430 A1* | 6/2011 | Shiramatsu | ......... | G11B 5/3133 |
| | | | | 360/75 |
| 2015/0162039 A1* | 6/2015 | Wolf | ................ | G11B 5/6064 |
| | | | | 360/75 |

\* cited by examiner

| | Units | Baseline | With Reader Heat Sink |
|---|---|---|---|
| Stroke Efficiency | Å/mW | 1.20 | 1.34 |
| Heater Temp Rise Rate (max) | °C/Å | 1.98 | 2.28 |
| Heater Temp Rise Rate (max) | °C/mW | 2.36 | 3.06 |
| Reader Temp Rise Rate (max) | °C/Å | 0.39 | 0.22 |
| ABS Temp Rise | °C | 62.67 | 36.56 |
| ABS Temp Rise Rate (max) | °C/Å | 0.40 | 0.23 |
| Heater Temp @ contact | °C | 374.9 | 421.3 |
| Reader Temp @ contact | °C | 125.4 | 99.7 |
| ABS Temp @ contact | °C | 127.7 | 101.6 |

SLIDER WITH HEAT SINK BETWEEN READ TRANSDUCER AND SUBSTRATE

RELATED PATENT DOCUMENTS

This application claims the benefit of Provisional Patent Application Ser. No. 62/461,952, filed on Feb. 22, 2017, to which priority is claimed pursuant to 35 U.S.C. § 119(e), and which is incorporated herein by reference in its entirety.

SUMMARY

The present disclosure is directed to a slider with a heat sink between a read transducer and a substrate. In one embodiment, a slider has a read transducer comprising first and second shields surrounding a read sensor. The first shields face a substrate. A first end of the reader stack is at a media-facing surface of the slider and a second end of the reader stack faces away from the first end. A heater is located farther away from the media-facing surface than the second end of the read transducer. The heater is configured to control a thermal protrusion of the read transducer from the media-facing surface. A heat sink is located between the first shield and the substrate.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
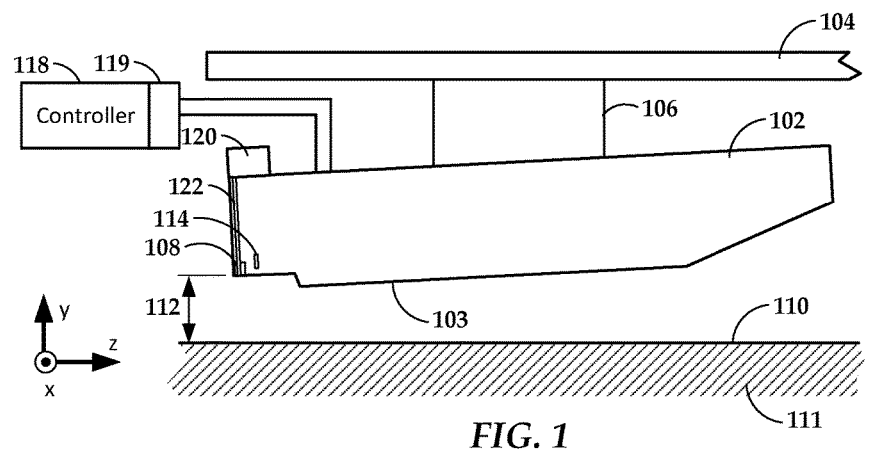
FIG. 1 is a block diagram of a hard disk drive slider and media arrangement according to an example embodiment.

The present disclosure generally relates to data storage devices that utilize magnetic storage media, e.g., disks. In some embodiments below, the devices use heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

The laser and optics in a HAMR recording head cause heating in the surrounding materials. In addition, the recording head typically includes other sources of heat, such as a write coil and a clearance control heater. The clearance control heater causes a thermal protrusion near the read/write transducers in response to an applied current. By selective application of power to the heater, the protrusion can provide a controllable amount of clearance between the transducers and the recording media surface. The heat produced by the write coil and optics also contributes to this protrusion, and these contributions are accounted for when setting clearances during writing.

During reading, a region near the reader (e.g., magnetic shield) is heated to control head-to-media spacing of the read transducer. The thermal flux into this region can also heat up the reader itself. In a HAMR device, the heads may have higher fly height compared to conventional (e.g., perpendicular magnetic recording) heads. As such, additional heat is applied to the reader shields to increase protrusion thereby allowing the desired reader-to-media spacing at this higher fly height. This can cause high reader temperatures during read operations in a HAMR device. Heat can degrade performance of the read transducer, e.g., cause magnetic instability, as well as degrade coatings applied at the media-facing surface that are designed to protect the reader and other components.

A read/write head may use a modified heater shape and or metallic blocks to actuate the reader shields. Generally, this arrangement can actuate the shield quickly via mechanical deformation of reader shields caused by a deforming of metal piece in its vicinity. Using the block can help reducing the heat input into the reader shields during operation. In the present disclosure, a heat sink is used to shunt the heat flux into a substrate and away from the reader shields thereby further reducing the heat input into the reader element. While this may be useful in HAMR devices as noted above, the embodiments may also be applicable to non-HAMR configurations.

On powering the reader heater, heat is conducted into the reader shields. The reader element being is thermally coupled to the reader shields and sees a rise in temperature as well. The embodiments described herein provide an alternate thermally low resistive path (referred to as a heat shunt blocks or heat sink) for the heat entering the reader shields and conducting the significant amount of heat away and thereby shielding the reader element from excessive heat transfer thereto. The geometric construction and location of the heat shunt blocks are carefully selected so that read transducer is not heated directly by the heater, thereby avoiding an undesired alternate heat flow path into the reader shields and reader. The designed structure has been modeled to show that the heat from the reader shields is shunted away into the substrate.

One process variable to consider is heater stroke efficiency. The choice of material for these embodiments should be such that the overall structural compliance of the head near the reader shields still provides actuation to meet the minimum or exceed the lower limit of the heater stroke efficiency. Three different materials have been explored and a structurally compliant material can be recognized from the results.

In reference now to FIG. 1, a block diagram shows a side view of a read/write head 102 according to an example embodiment. The read/write head 102 may be used in a magnetic data storage device, e.g., conventional or HAMR hard disk drive. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a fly height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. This variation in clearance is sometimes referred to as "dynamic fly height." The amount of current applied to the heater 114 may vary based on which of the read/write transducers 108 are in use, and may also be adjusted to account for irregularities in the media surface 110, changes in ambient temperature, location of the read/write head 102 over the medium 111, etc. Thermal sensors (not shown) may also be included in the read/write head 102 to facilitate measuring clearances, e.g., by measuring a thermal profile as a function of heater power.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 may be configured as a HAMR device, in which case it includes additional components that form a hot spot on the recording medium 111 near the read/write transducer 108. These components include a laser 120 (or other energy source) and a waveguide 122. The waveguide 122 delivers light from the laser 120 to components near the read/write transducers 108. These components are shown in greater detail in FIG. 2, which is a block diagram illustrating a cross-sectional view of the read/write head 102 near the read/write transducers 108 according to an example embodiment.

The read/write transducer 108 includes a write transducer 108b is located downtrack from a read transducer 108a. The write transducer 108b includes a coil 200 that, when energized, induces magnetic flux through a write pole 202 and return poles 204, 206. The aforementioned waveguide 122 is part of an optical path that delivers light to a near-field transducer (NFT) 203 located near the write pole 202. The NFT 203 shapes and directs a stream of plasmons out of the media-facing surface 103 when recording.

The read transducer 108a may be configured as a magnetoresistive stack 210 (e.g., giant magnetoresistive, tunnel magnetoresistive, etc.) surrounded by magnetic shields 212, 214. A reader heater 216 is located above the reader 108a, e.g., farther away from the media-facing surface than the reader 108a. The reader heater 216 is located on a different substrate-parallel plane (xy-plane in this drawing) than the closest shield 212 of the reader 108a. The reader heater 216 causes local thermal expansion response to an applied current. A push block 217 is located above reader shield 212 and expansion of the push block 217 due to the local heating causes protrusion of the reader 108a from the media-facing surface 103, which pushes the reader 108a closer to the recording medium 111. The push block 217 may be formed of a material with high coefficient of thermal expansion, which increases stroke efficiency.

Figure 3:
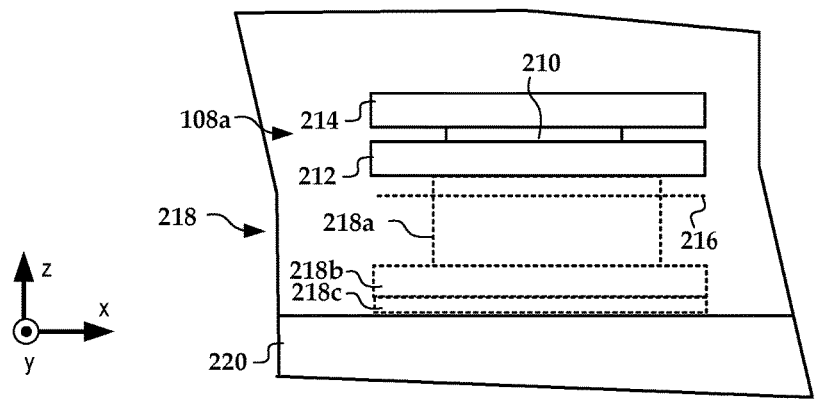
FIG. 3 is a plan view from the media-facing surface of the read/write head of FIG. 2.

A heat sink 218 conducts heat away from the reader shields 212, 214 and towards a substrate 220. The heat sink 218 includes a first portion 218a that directly abuts the read shield 212. A second portion 218b joins the first portion 218a. The second portion 218b extends farther away from the media-facing surface 103 than the first portion 218a. A third portion 218c is a thin layer of material that extends even farther away from the media-facing surface 103 than the other portions 218a-b, even past the heater 216 and push block 217. The parts of the heat sink 218 and reader 108a can also be seen in FIG. 3, which is a view from the media-facing surface.

The heat sink 218 is preferably made from materials with high thermal conductivity, high coefficient of thermal expansion, and low elastic modulus. This combination of material properties provides good heat-sinking and stroke characteristics. Materials for the heat sink 218 may include any combination of NiFe, Ni, Al, Cu, NiCu, W, Ru, Au, Ta, NiCr, Cr, NiRu, TaN, Rt, SiN, Rh.

Figure 4:
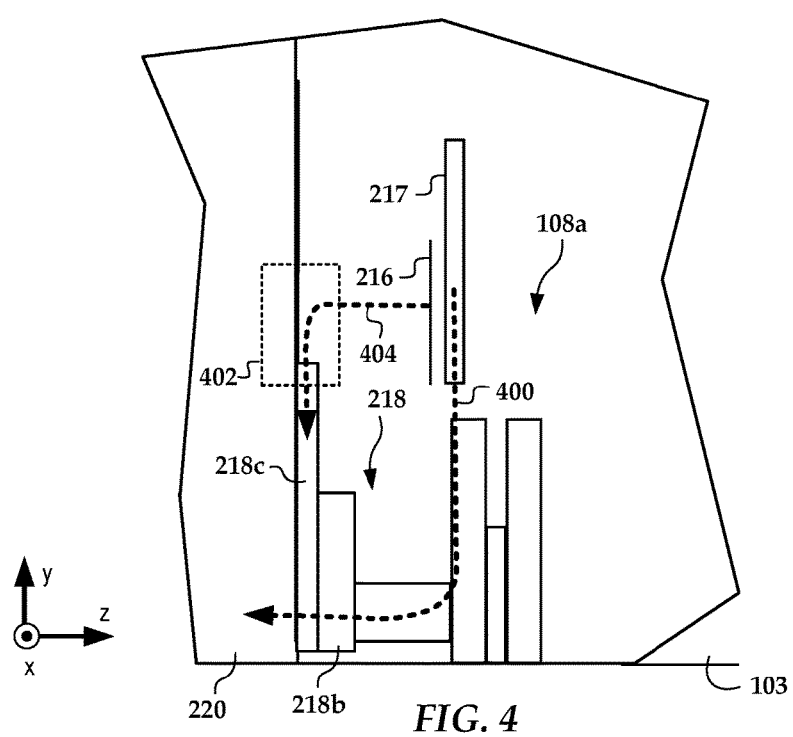
FIG. 4 is a close-up, cross-sectional view of the read/write head of FIG. 2.

Generally, the heat sink 218 allows sufficient localized heating to cause expansion near the push block 217 while preventing excessive heating of the reader 108a. In FIG. 4, a close-up cross-sectional view of the reader shown in FIG. 2 includes a curve 400 that represents a heat transfer path of least thermal resistance through the shield 212 and heat sink 218 to the substrate 220. By drawing heat away from the reader 108a near the stack 210, the stack temperature can remain lower than if the region occupied by the heat sink 218 were filled by a dielectric such as alumina. As indicated by region 402, the heat sink portion 218c may be sized/shaped to minimize heat transfer (e.g., via conductance and/or radiation) directly from the heater 216, as indicated by path 404. If sufficient thermal energy was transferred from the heater 216 along path 404 to other parts of the heat sink 218a-b, then this could reduce the effectiveness of the heat sink 218. In embodiments shown below, a heat sink can include features to minimize direct heat transfer from the heater. The shape of the heat sink is based on the heater location, such that the heat sink gets heated by heat transfer from the reader shields instead of the heater.

Figure 2:
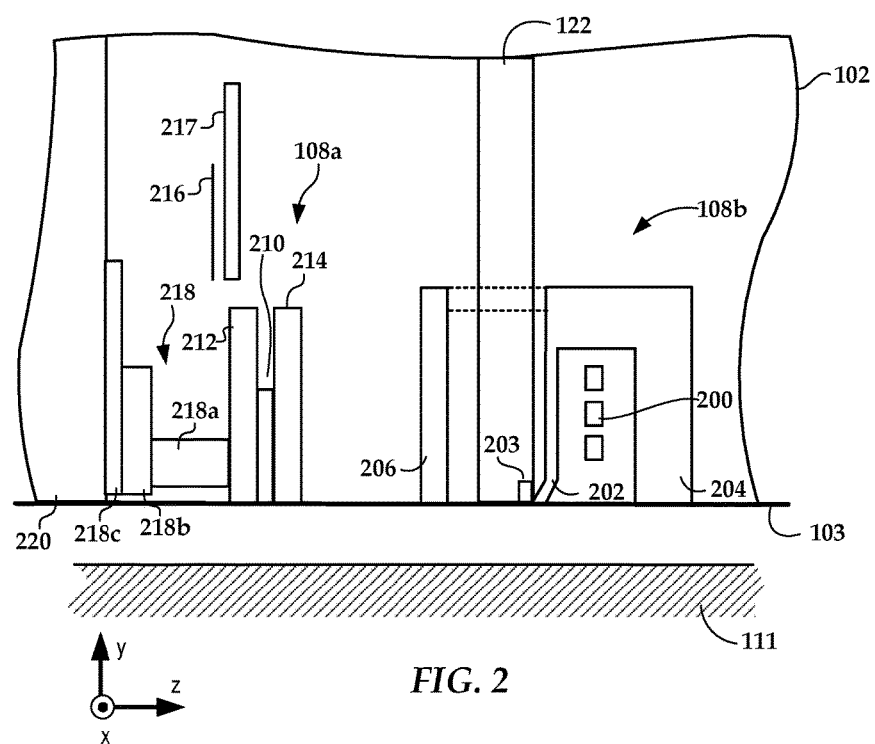
FIG. 2 is a cross-sectional view of a read/write head according to an example embodiment.
Figure 5:
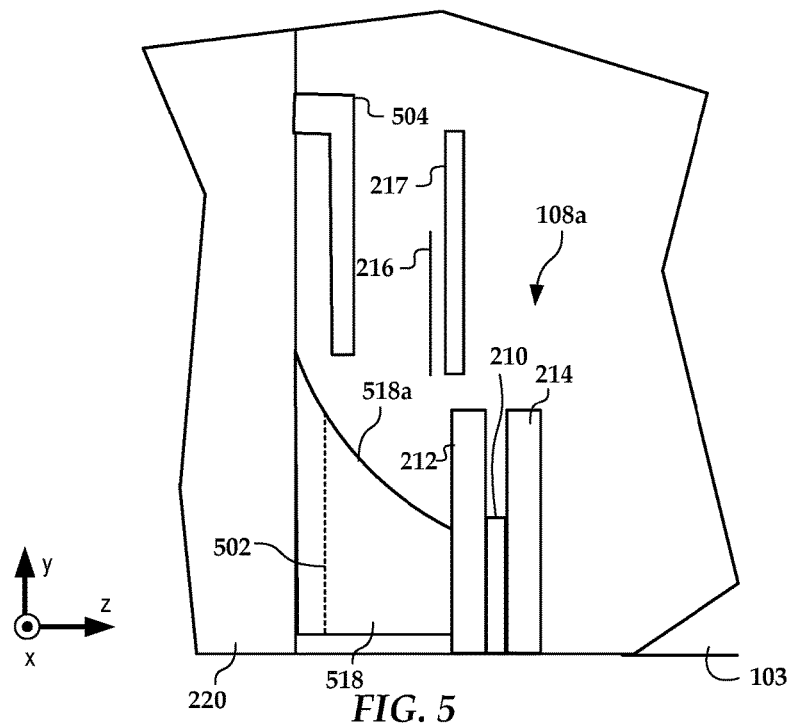
FIG. 5 is a cross-sectional view of a read/write head according to another example embodiment.

In FIG. 5, a block diagram shows a reader heat sink 518 according to another embodiment. Instead of forming a heat sink from staggered rectangular layers/portions as shown in FIG. 2, the heat sink 518 is formed of a continuous shape, e.g., with smooth, curved, top surface 518a extending from reader shield 212 to substrate 220. In other embodiments, the top surface 518a may be any continuous shape. For example a linear top surface 518a may be used, resulting in the heat sink 518 having a right-trapezoidal shape in this view. The heat sink 518 may formed of a single material, or may be formed of layers of different material, as indicated by dashed line 502. While the heat sink 518 has a continuous shape, it may still be considered to have two or more portions, one portion near the substrate 220 that extends further away from the media-facing surface 103 than a second portion near the shield 212.

The cross-track dimension of the heat sink 518 (x-dimension in this figure) can be smaller, equal, or wider than corresponding dimension of the shield 212. This shape can draw heat way from the reader 108a without significant impact on the ability of the reader 108a to protrude. Other features may also be included to inhibit direct heat transfer between the heater 216 and the heat sinks described herein, such as secondary heat sink 504 that draws heat from one side of the heater 216 to a region of the substrate 220 that is further away from the media-facing surface 103 than the reader 108.

Figure 6A:
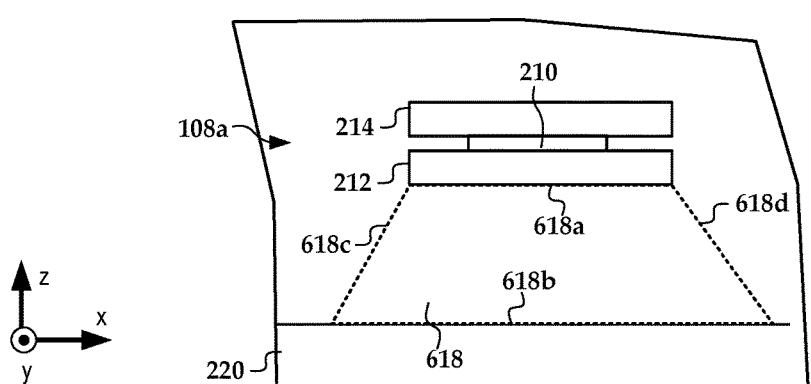
FIGS. 6A-D are a plan views from the media-facing surface of a read/write head according to other example embodiments.

In FIGS. 6A-D, views from the media-facing surface of a read head shows heat sink geometry according to other example embodiments. In FIG. 6A, heat sink 618 may have geometry similar to those described elsewhere herein, e.g., FIGS. 2 and 5. A first side 618a of the heat sink 618 facing the reader 108a is approximately the same size as reader shield 212, although may be larger or smaller in other embodiments. A second side 618b facing the substrate 220 is larger than the first side 618a. Sides 618c-d taper from the first to second sides 618a-b, and are shows with a linear profile. In other embodiments, the sides 618c-d may have a curved profile, e.g., similar to surface 518a shown in FIG. 5.

Figure 6B:
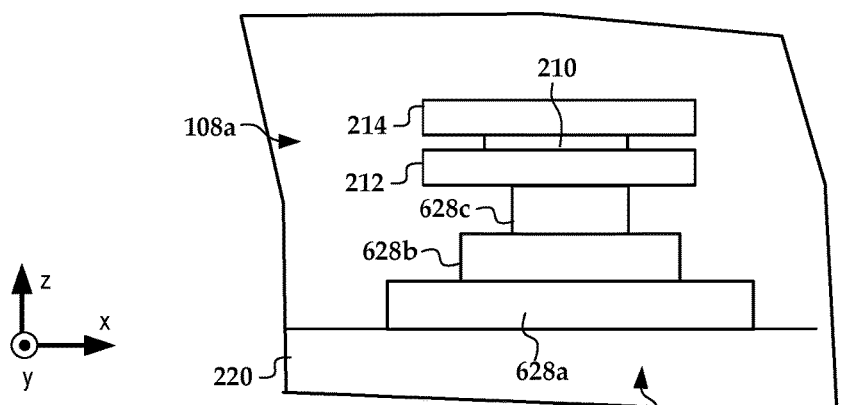
Figure 6C:
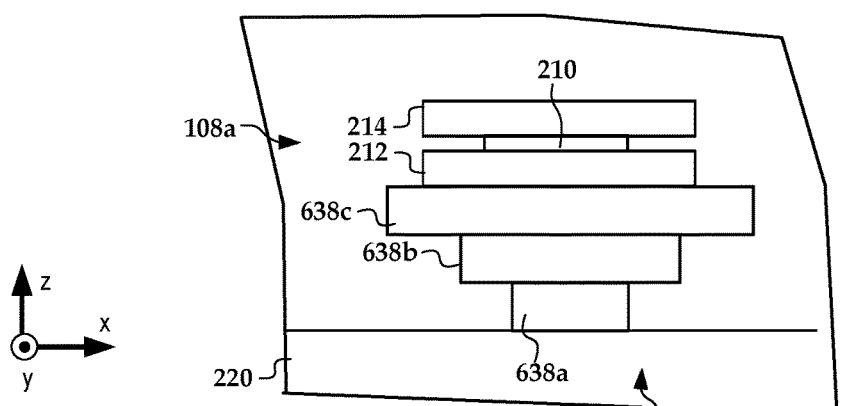
Figure 6D:
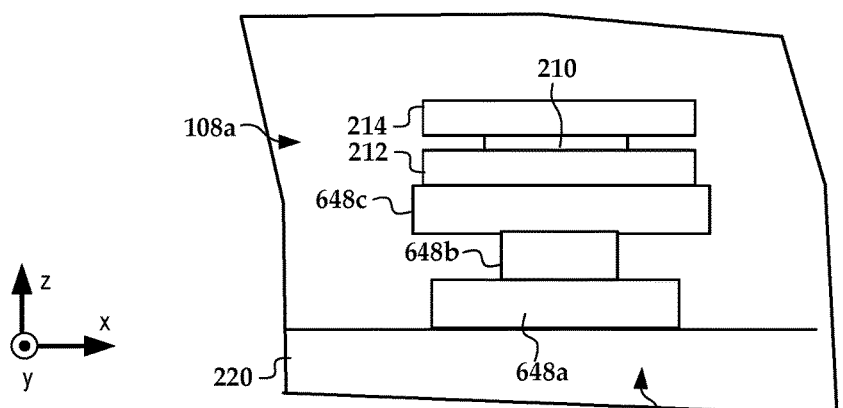

In FIG. 6B, a heat sink 628 has discrete portions 628a-628c that have successively smaller crosstrack width from the substrate 220 to the reader 108a. Three discrete portions 628a-c are shown, although any number may be used. In FIG. 6C, a heat sink 638 has discrete portions 638a-638c that have successively larger crosstrack widths from the substrate 220 to the reader 108a. In FIG. 6D, a heat sink 648 has discrete portions 648a, 648c that have relatively larger crosstrack widths near the substrate 220 and the reader 108a, with middle portion 648b having a smaller crosstrack width than the other two portions 648a, 648c. When viewed from the side, the sinks 628, 638, 648 may have geometry similar to those described elsewhere herein, e.g., FIGS. 2 and 5.

Figures 7, 8:
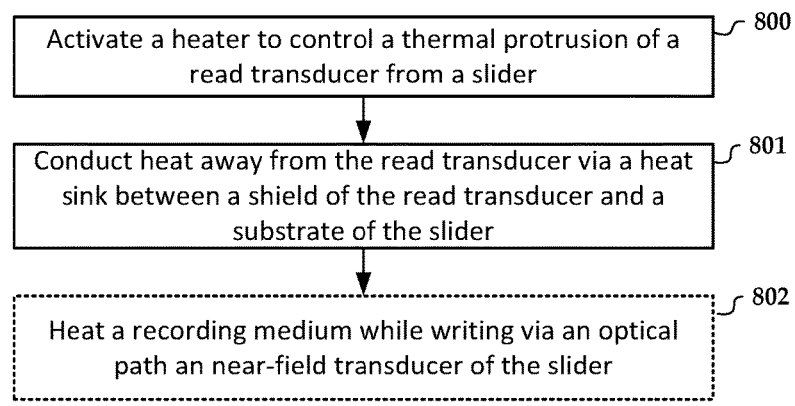
FIG. 7 is a table showing analysis results for a read/write head according to an example embodiment.
FIG. 8 is a flowchart of a method according to an example embodiment.

In FIG. 7, a table shows an example of analysis of a recording head utilizing a reader heat sink according to an example embodiment. The same analysis was also performed for a similar head using no heat sink, and this is reflected in the 'Baseline' column. The temperature rise rate of the reader, which is the increase in temperature per unit of protrusion and shown in the fourth row, is lowered by about 56% compared to the baseline (0.22 vs. 0.39). The temperature rise rate at the ABS is similarly reduced, showing that the heat sink can benefit both the reader and the ABS coating. Note that stroke efficiency shown in the first row has increased with the heat sink.

In FIG. 8, a flowchart illustrates a method according to an example embodiment. The method involves activating 800 a heater to control a thermal protrusion of a read transducer from a media-facing surface of a slider. The heater is located farther away from the media-facing surface than the read transducer. Heat from the heater is conducted 801 away from the read transducer via a heat sink between a shield of the read transducer and a substrate of the slider. As the slider may be configured for HAMR operation, the method may optionally include heating 802 a recording medium via an optical path and near-field transducer of the slider when writing.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A slider, comprising:
   a substrate;
   a read transducer comprising first and second shields surrounding a read sensor, the first shield facing the substrate, a first end of the reader stack at a media-facing surface of the slider and a second end of the reader stack facing away from the first end;
   a heater located farther away from the media-facing surface than the second end of the read transducer, the heater configured to control a thermal protrusion of the read transducer from the media-facing surface;
   a heat sink between and in contact with both the first shield and the substrate, the heat sink configured to conduct heat from the first shield to the substrate while minimizing heat transfer between the heater and the substrate.

2. The slider of claim 1, wherein the heat sink is located proximate the media-facing surface.

3. The slider of claim 1, wherein the heater is located on a different substrate-parallel plane than the reader stack.

4. The slider of claim 1, further comprising an optical path and laser configured to heat a recording medium when writing.

5. The slider of claim 1, further comprising a push block proximate the heater and overlapping at least part of the read transducer relative to the media-facing surface, the push block having a high coefficient of thermal expansion, wherein a portion of the heat sink in contact with the substrate extends along the substrate away towards the push block, the portion of the heat sink being thin so as to minimize heat transfer from the push block to the substrate.

6. The slider of claim 1, wherein the heat sink comprises staggered layers between the first shield and the substrate.

7. The slider of claim 1, wherein a side of the heat sink facing away from the media facing surface comprises a continuous shape extending from the first shield to the substrate.

8. The slider of claim 1, wherein the heat sink has first cross-track dimension proximate the substrate that is larger than a second cross-track dimension proximate the first shield.

9. A slider, comprising:
   a substrate;
   a read transducer comprising first and second shields surrounding a read sensor, the first shield facing the substrate, a first end of the reader stack at a media-facing surface of the slider and a second end of the reader stack facing away from the first end;
   a heater located farther away from the media-facing surface than the second end of the read transducer, the heater configured to control a thermal protrusion of the read transducer from the media-facing surface;

a heat sink between the first shield and the substrate, the heat sink comprising:

a first portion that abuts the first shield;

a second portion extending from the first portion towards the substrate, the second portion extending farther away from the media-facing surface than the first portion; and a third portion between the second portion and the substrate, the third portion comprising a thin layer of material extending farther away from the media-facing surface than both the first and second portions.

10. The slider of claim 9, wherein the heat sink comprises a top surface facing away from the media-facing surface, the top surface comprising a continuous shape from the first shield to the substrate.

11. The slider of claim 9, wherein the heat sink has first cross-track dimension proximate the substrate that is larger than a second cross-track dimension proximate the first shield.

12. The method of claim 9, wherein the heat sink has first cross-track dimension proximate the substrate that is larger than a second cross-track dimension proximate the first shield.

13. A method comprising, activating a heater to control a thermal protrusion of a read transducer from a media-facing surface of a slider, the heater located farther away from the media-facing surface than the read transducer; and conducting heat from the heater away from the read transducer via a heat sink between a shield of the read transducer and a substrate of the slider, the heat sink comprising:

a first portion that abuts the first shield;

a second portion extending from the first portion towards the substrate, the second portion extending farther away from the media-facing surface than the first portion; and a third portion between the second portion and the substrate, the third portion comprising a thin layer of material extending farther away from the media-facing surface than both the first and second portions.

14. The method of claim 13, wherein the heat sink is located proximate the media-facing surface.

15. The method of claim 13, wherein the heater is located on a different substrate-parallel plane of the slider than the reader stack.

16. The method of claim 13, further comprising, when writing, heating a recording medium via an optical path and laser of the slider.

17. The method of claim 13, wherein controlling the thermal protrusion of the read transducer comprises heating a push block proximate the heater and overlapping at least part of the read transducer relative to the media-facing surface, the push block having a high coefficient of thermal expansion.

18. A slider, comprising:

a substrate;

a read transducer comprising first and second shields surrounding a read sensor, the first shield facing the substrate, a first end of the reader stack at a media-facing surface of the slider and a second end of the reader stack facing away from the first end;

a heater located farther away from the media-facing surface than the second end of the read transducer, the heater configured to control a thermal protrusion of the read transducer from the media-facing surface; and a heat sink proximate to both the first shield and the substrate near the media-facing surface, the heat sink conducting heat generated by the heater to the substrate, thereby lowering an operating temperature of the read transducer, the heat sink comprising:

a first portion that abuts the first shield;

a second portion extending from the first portion towards the substrate, the second portion extending farther away from the media-facing surface than the first portion; and a third portion between the second portion and the substrate, the third portion comprising a thin layer of material extending farther away from the media-facing surface than both the first and second portions.

19. The slider of claim 18, further comprising a push block proximate the heater and overlapping at least part of the read transducer relative to the media-facing surface, the push block having a high coefficient of thermal expansion.

20. The slider of claim 19, wherein the heat sink comprises a top surface facing away from the media-facing surface, the top surface comprising a continuous shape from the first shield to the substrate.

* * * * *